United States Patent [19]

Enneking et al.

[11] Patent Number: 4,730,716
[45] Date of Patent: Mar. 15, 1988

[54] STEEP ANGLE CONVEYOR WITH ARTICULATED FRAMES

[75] Inventors: Gregor Enneking, Neuenkirchen, Fed. Rep. of Germany; Herbert Von Blomberg, North Sidney, Australia

[73] Assignee: Fried. Krupp Gesellschaft mit beschränkter Haftung, Essen, Fed. Rep. of Germany

[21] Appl. No.: 899,555

[22] Filed: Aug. 25, 1986

[30] Foreign Application Priority Data

Aug. 29, 1985 [DE] Fed. Rep. of Germany ....... 3530810
Jul. 15, 1986 [DE] Fed. Rep. of Germany ....... 3623813

[51] Int. Cl.$^4$ ............................................. B65G 41/00
[52] U.S. Cl. .................................... 198/304; 198/311; 198/312; 198/313; 198/861.2
[58] Field of Search ...................... 198/311, 313, 861.2, 198/303, 304, 312

[56] References Cited

U.S. PATENT DOCUMENTS

| | | | |
|---|---|---|---|
| 551,509 | 12/1895 | Paul | 198/861.2 |
| 1,462,510 | 7/1923 | Lister | 198/311 X |
| 2,242,206 | 5/1941 | Bisset | 198/303 |
| 3,134,480 | 5/1964 | Loosly | 198/311 X |
| 3,361,248 | 1/1968 | Daymon | 198/861.2 X |
| 3,572,496 | 3/1971 | Cutts, Sr. et al. | 198/861.2 |
| 3,590,983 | 7/1971 | Oury | 198/312 X |
| 4,234,073 | 11/1980 | Satterwhite | 198/861.2 X |
| 4,646,906 | 3/1987 | Wilcox, Jr. et al. | 198/303 |

FOREIGN PATENT DOCUMENTS

| | | | |
|---|---|---|---|
| 0422030 | 1/1929 | Fed. Rep. of Germany | 198/313 |
| 1692620 | 2/1955 | Fed. Rep. of Germany . | |
| 942079 | 4/1956 | Fed. Rep. of Germany . | |
| 3217745 | 1/1985 | Fed. Rep. of Germany . | |
| 0235235 | 4/1986 | German Democratic Rep. | 198/303 |
| 828449 | 2/1960 | United Kingdom . | |
| 2087332A | 5/1982 | United Kingdom . | |
| 2108918A | 5/1983 | United Kingdom . | |
| 2136753A | 9/1984 | United Kingdom . | |
| 0349791 | 1/1972 | U.S.S.R. | 198/312 |

OTHER PUBLICATIONS

U. Kunstmann et al, "New Dimensions in Capacity and Elevation with the FLEXOFAST Conveyor System," bulk solids handling, vol. 4, No. 1 (Mar. 1984), pp. 105-112.

Primary Examiner—Robert J. Spar
Assistant Examiner—D. Glenn Dayoan
Attorney, Agent, or Firm—Spencer & Frank

[57] ABSTRACT

A steep angle conveyor for lifting bulk material from a lower level to a higher level is able to accommodate variations in the vertical distance between the levels. The conveyor includes a lower frame that is supported at the lower level by a drive mechanism, an upper frame that is supported at the upper level by another drive mechanism, and an obliquely disposed intermediate frame that is connected to the upper and lower frame by hinges. Rollers on the frames guide a belt.

13 Claims, 7 Drawing Figures

STEEP ANGLE CONVEYOR WITH ARTICULATED FRAMES

BACKGROUND OF THE INVENTION

The present invention is directed to a steep angle conveyor for conveying bulk material or the like from one level to a higher level. The apparatus includes a lower conveyor frame which is supported on a lower surface by means of a lower drive mechanism and an upper conveyor frame which is supported on an upper surface by means of an upper drive mechanism, the lower and upper conveyor frames being connected by means of an intermediate frame. The frames accommodating a conveyor belt, one end of which is associated with a feeding device and the other end of which is associated with a discharging device.

German Utility Model No. 1,692,620 discloses a steep angle conveyor in which the conveyor belt is accommodated in a rigid conveyor frame which is able to operate only at an unchanging steep slope, with the vertical distance between the lower level and the upper level being fixed.

To compensate for irregular differences in height between the surfaces, it is also known to manufacture the conveyor frame of two telescoping parts. German Patent No. 942,079 discloses a configuration in which the conveyor is equipped with a vertical tower on which an adjustable-height bridge is disposed. However, these conveyors are very complicated in structure and, additionally, the vertical transport of material is very difficult.

To compensate for the differences in height between the lower and upper surfaces, it is further known (German Patent No. 3,217,745) to support a steep angle conveyor on only one drive mechanism, which is movable on the lower surface. The upper conveyor frame is designed as a pivotal cantilever which is held by a supporting frame having a counterbalancing cantilever and a cable winch device. This again involves high expenditures.

SUMMARY OF THE INVENTION

It is an object of the present invention to provide a steep angle conveyor of the above-mentioned type in which differences in height between the lower and upper drive mechanisms can be accommodated with simple means.

In the present invention this object is attained by using hinges to connect lower and upper conveyor frames to an intermediate frame, with the hinges having horizontal axes which are oriented transversely to the conveyor frames. The conveyor belt guided by the frames is an endless belt.

With an apparatus according to the invention, the intermediate frame can be brought to any position between the vertical and the horizontal. That is, the slope or inclination of the intermediate frame can be varied as desired between the vertical position and the horizontal position, without the horizontal or almost horizontal orientation of the lower and upper conveyor frames having to be changed. A further advantage is that an apparatus according to the invention is a bridge device which can be independently moved from one location to another. Particularly in pit operations, this device is able to move out of the pit on its own.

DESCRIPTION OF THE PREFERRED EMBODIMENT

Figure 1:
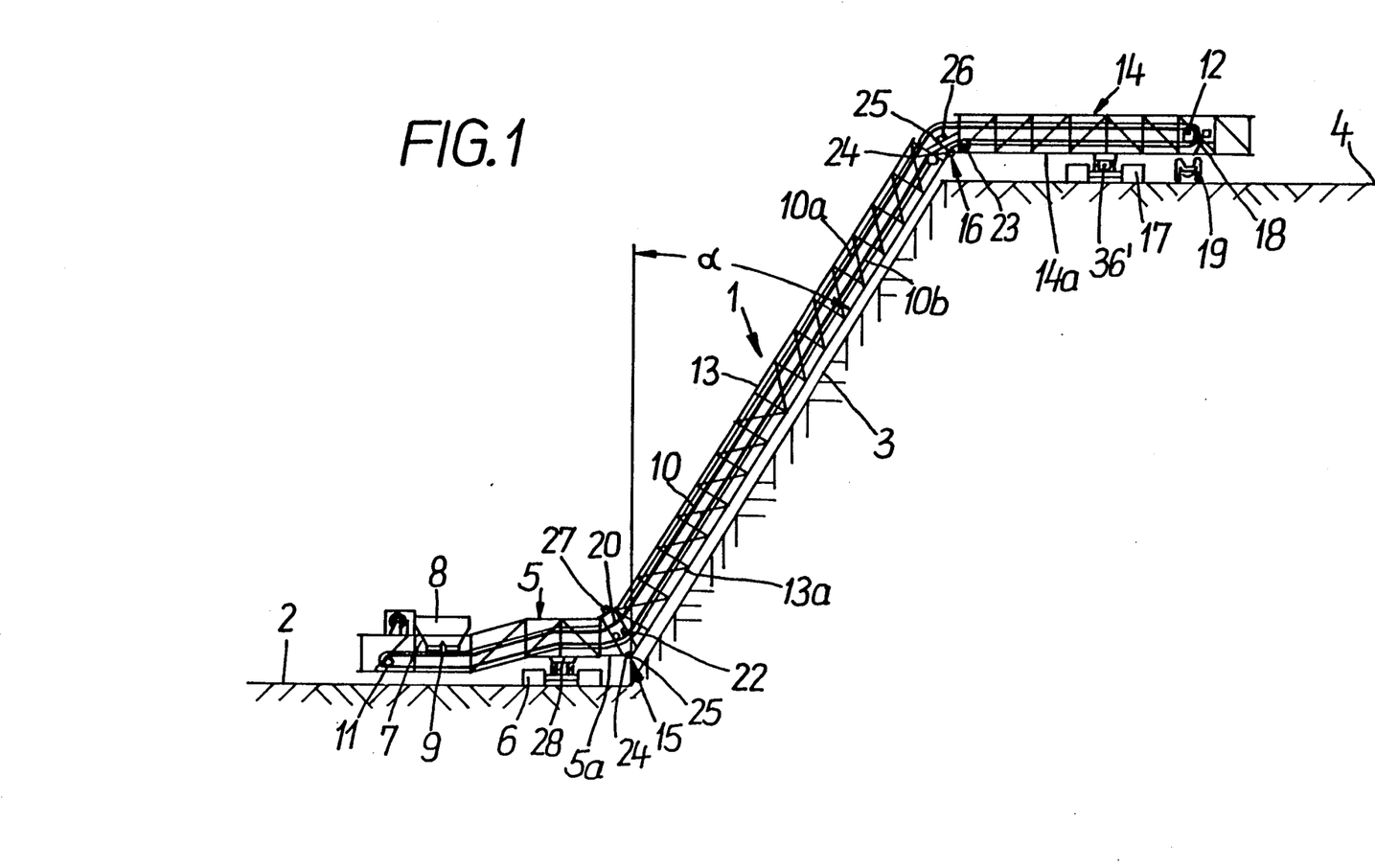
FIG. 1 is a side view of a steep angle conveyor in accordance with the present invention.
Figure 3:
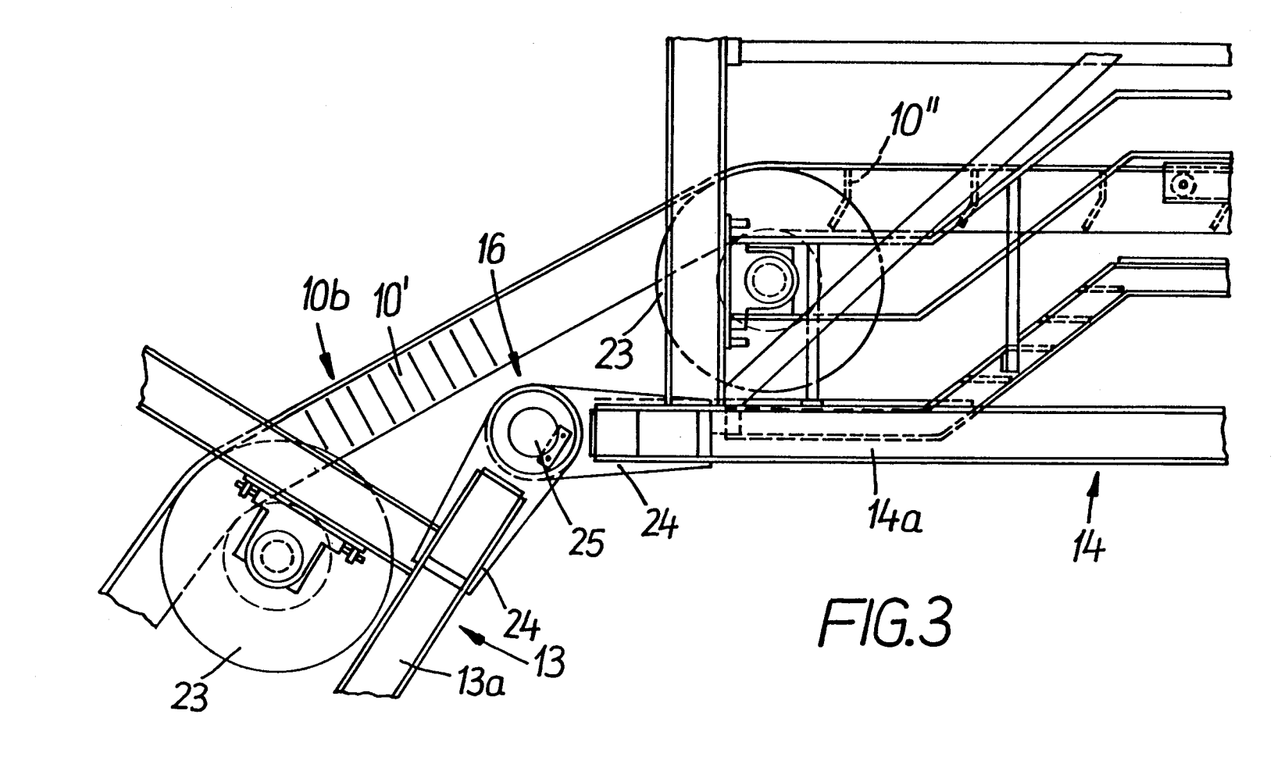
FIG. 3 is a side view illustrating the upper point of articulation of the steep angle conveyor in enlarged detail.

With initial reference to FIG. 1, the steep angle conveyor 1 operates at a slope 3 between a lower surface 2 and an upper surface 4. Lower surface 2 may, for example, be the floor of an open pit mine. Essentially, the steep angle conveyor 1 is composed of a lower conveyor frame 5, an intermediate frame 13, and an upper conveyor frame 14, with an endless conveyor belt 10 being disposed in the conveyor frames. Conveyor belt 10, as described in more detail in the periodical "bulk solids handling," Volume 4, No. 1, March 1984, pages 105–112 (published by Transtech Publications, P.O. Box 266, D-3392 Clausthal-Zellerfeld, Federal Republic of Germany), is provided with corrugated edge strips 10' (FIG. 3) and with transverse cleats 10" (FIG. 3) disposed therebetween to form pockets which permit material to be carried up a steep incline. Belt 10 is guided over a lower reversal roller 11 and an upper reversal roller 12, thus forming an upper belt segment 10a and a lower belt segment 10b. Belt 10 is moved by engines (not illustrated) that are coupled to rollers 11 and/or 12.

Figure 5:
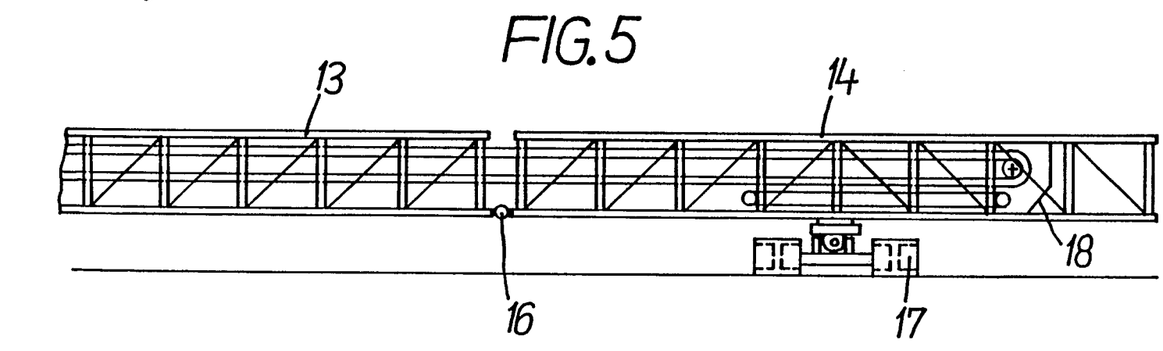
FIG. 5 is a side view of the upper conveyor frame disposed in a common horizontal plane with respect to the intermediate frame.

The lower conveyor frame 5 is connected with the intermediate frame 13 by means of a lower hinge 15 and the intermediate frame 13 is connected with the upper conveyor frame 14 by means of an upper hinge 16. The lower conveyor frame 5 is supported on the lower floor 2 by means of a lower drive mechanism 6 and the upper conveyor frame 14 is supported by an upper drive mechanism 17. Intermediate frame 13, lacking its own independent support, is indirectly supported by drive mechanisms 6 and 17 by virtue of its articulated connection to frames 5 and 6. Drive mechanisms 6 and 17, in addition to supporting conveyor 1, are vehicles which can move conveyor 1 as a unit from one place to another. For example, it may be possible to move conveyor 1 to a new location in an open pit mine, depending on the mine's layout, while lower drive mechanism 6 remains on surface 2 and upper drive mechanism 17 remains on surface 4. On the other hand it may be necessary to remove conveyor 1 from the mine, and FIG. 5 illustrates a portion of conveyor 1 when drive mechanisms 6 and 17 are disposed on a common horizontal plane so that conveyor 1 can be moved across either surface 2 or 4. At any rate, after conveyor 1 has been moved to the desired location the drive mechanisms 6 and 17 permit frames 5 and 14 to be positioned as necessary in view of the vertical distance between the surfaces 2 and 4. For example if lower surface 2 in FIG. 1 were illustrated one inch higher in the drawing, this change in height could be accommodated by moving frame 5 outward from the foot of slope 3. Thus while length of intermediate frame 13 is fixed, the angle $\alpha$ is not, and this variability permits frame 13 to span different heights as the need arises.

Figure 6:
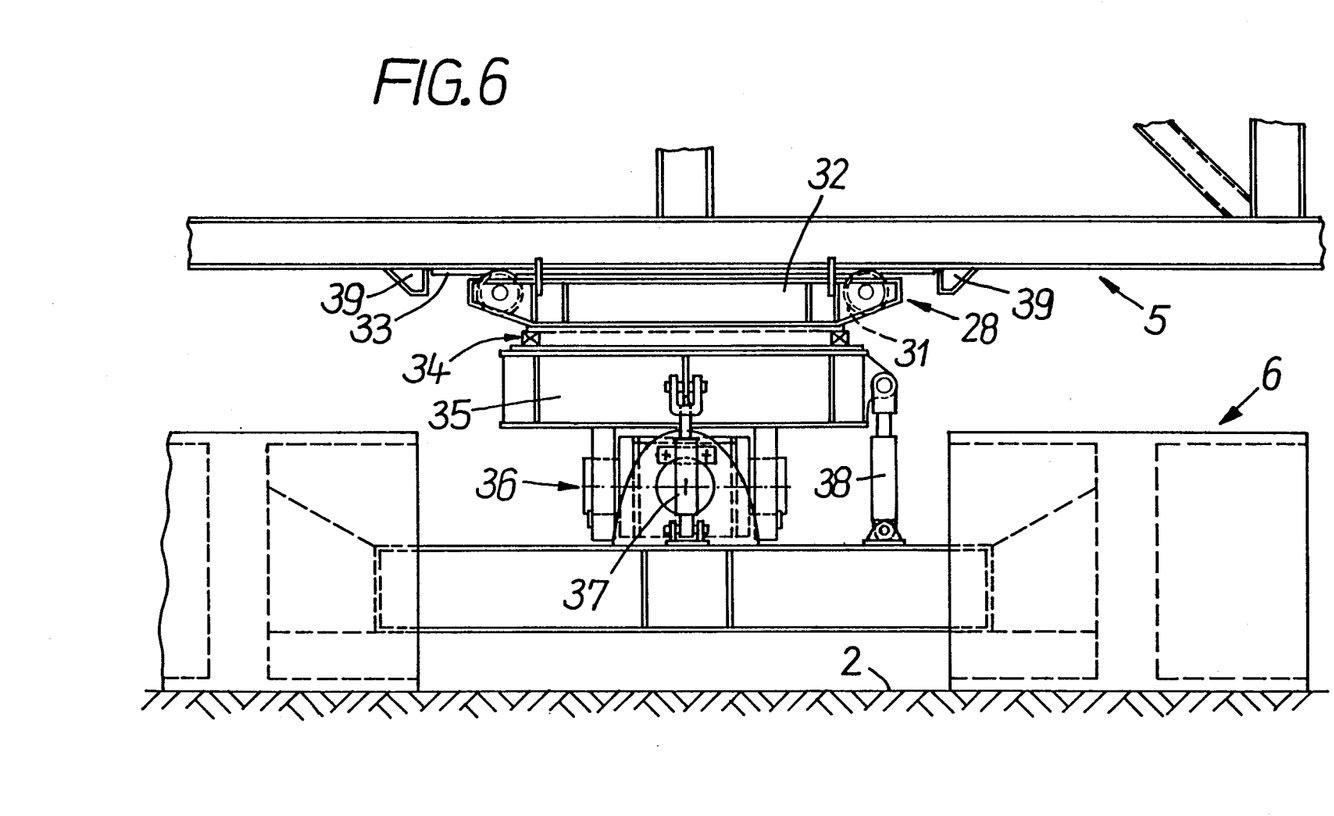
FIG. 6 is a side view illustrating, in enlarged detail, the support for the lower conveyor frame on the lower drive mechanism.

Turning next to FIG. 6, the connection between the lower conveyor frame 5 and the lower drive mechanism 6 is configured as a displaceable device 28 so that longitudinal displacements are possible between frame 5 and drive mechanism 6. For this purpose, device 28 is provided at drive mechanism 6 with a support frame 32 equipped with rollers 31. Frame 5 is supported on rollers 31 by means of rails 33 fastened to frame 32. Stops 39 are fastened to frame 5 at the ends of rails 33 to prevent frame 32 from rolling beyond rails 33. Support frame 32 is supported on an auxiliary frame 35 by means of a ball bearing turntable 34, and auxiliary frame 35 is in turn supported on drive mechanism 6 by means of a cardan or universal joint arrangement 36. It is desirable for frame 5 to be level even if the surface 2 on which drive mechanism 6 rests is not. To set or correct the angular position of frame 5 with respect to drive mechanism 6, two hydraulic cylinders 37 and 38 are disposed between auxiliary frame 35 and drive mechanism 6, one in the longitudinal plane and the other in the transverse plane of drive mechanism 6. With the aid of cylinders 37 and 38, different ground slopes can be accommodated.

Figure 7:
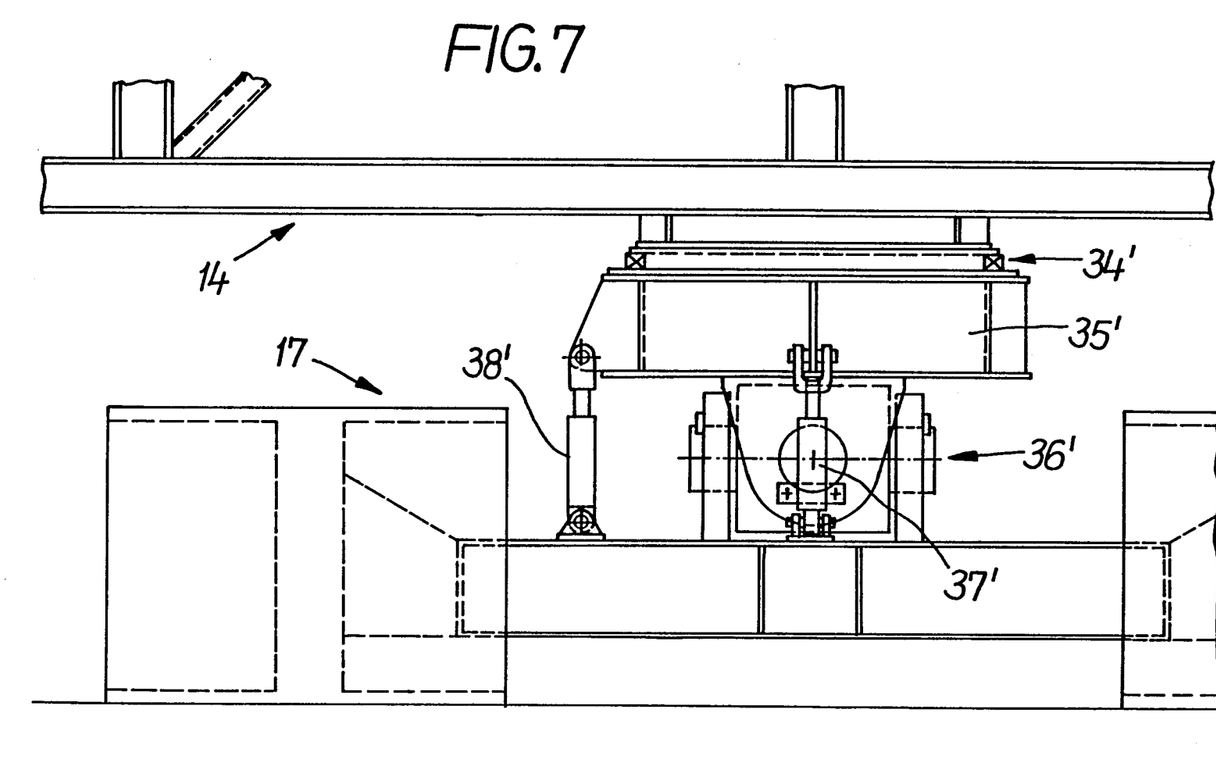
FIG. 7 is a side view illustrating, in enlarged detail, the support for the upper conveyor frame on the upper drive mechanism.

Referring next to FIG. 7, the upper conveyor frame 14 is likewise connected with upper drive mechanism 17 so as to be pivotal about a vertical axis and about horizontal axes in the longitudinal and transverse directions. However a single displaceable device 28 (FIG. 6) is sufficient for protecting conveyor 1 from strains that would otherwise arise should drive mechanisms 6 and 17 be slightly too close together or too far apart, so a further displaceable device is not needed at drive mechanism 17. Frame 14 is supported on an auxiliary frame 35' by a ball bearing turntable 34' and auxiliary frame 35' is supported on drive mechanism 17 by means of a cardan or universal joint arrangement 36'. Between auxiliary frame 35'0 and drive mechanism 17 there are provided two hydraulic cylinders 37' and 38'.

Returning to FIG. 1, in the region of lower conveyor frame 5, a feeding device 7 is provided which is composed of a feed funnel 8 and a feed belt 9. Feed belt 9 is provided for the purpose of reducing the height of the drop of the material to be transported when it is transferred to conveyor belt 10.

In the region of upper conveyor frame 14, a discharge device 18 is provided which has an associated discharge belt 19 placed on upper floor 4.

Figure 2:
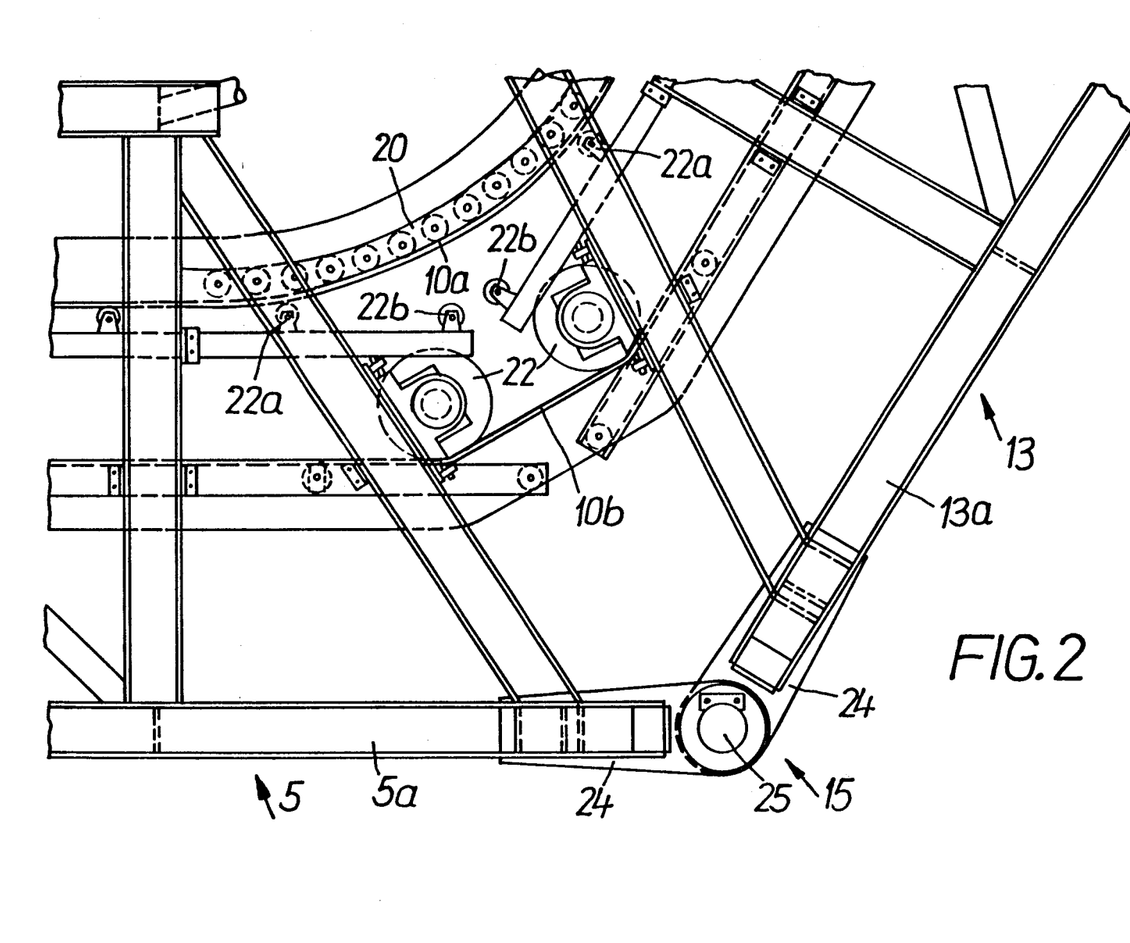
FIG. 2 is a side view illustrating the lower point of articulation of the steep angle conveyor in enlarged detail.
Figure 4:
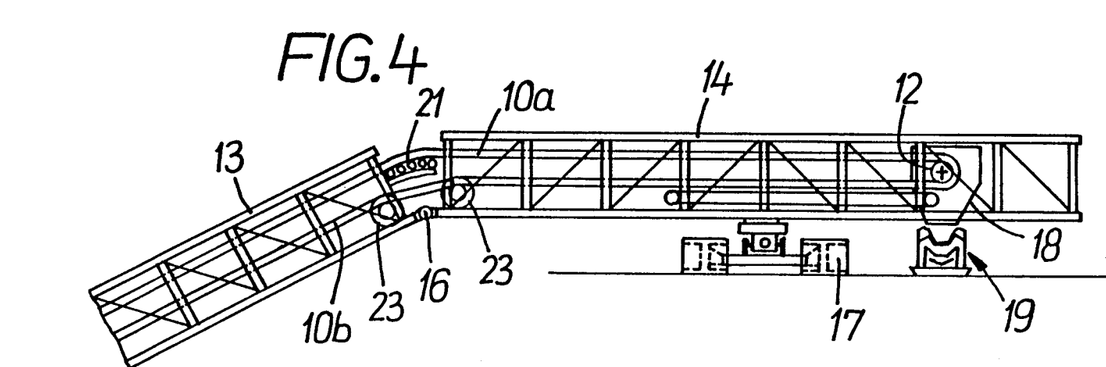
FIG. 4 is a side view of the upper conveyor frame disposed at an angle with respect to the intermediate frame.

Referring next to FIGS. 2 and 4, in the region of hinge connections 15 and 16, between conveyor frames 5 and 14 and intermediate frame 13, a lower roller conveyor 20 and an upper roller conveyor 21 are provided to support the upper segment or run 10a of conveyor belt 10. Lower guide rollers 22 and upper guide rollers 23 are provided in the above-stated regions to support the lower segment or run 10b of conveyor belt 10.

As can be seen in FIG. 2, guide rollers 22a and 22b are provided in the connection region between frames 5 and 13. Depending on the angular position of intermediate frame 13, the upper run 10a of conveyor belt 10 rests on the two guide rollers 22a and possibly on the two guide rollers 22b. These rollers are arranged in such a manner that they participate in the pivoting movement of the frame sections.

Hinges 15 and 16 (see FIGS. 2 and 3) may be provided with hinge members 24 which are attached at cross beams 5a, 13a and 14a of frames 5, 13 and 14, each connected to the other by means of bolts 25.

While conveyor frames 5 and 14 hold the entire steep angle conveyor 1 in balance by suitably distributing its weight, it may be of advantage, in order to better stabilize the entire conveyor framework, to provide hydraulic cylinders 26 and 27 between lower conveyor frame 5 and intermediate frame 13 and/or between upper conveyor frame 14 and intermediate frame 13.

It will be understood that the above description of the present invention is susceptible to various modifications, changes and adaptations, and the same are intended to be comprehended within the meaning and range of equivalents of the appended claims.

What we claim is

1. A steep angle conveyor for transporting bulk material from a lower level to a higher level, comprising:

a lower conveyor frame having first and second ends;

a lower drive mechanism which supports the lower frame, above a lower surface, at a support position between the first and second ends of the lower frame;

an upper conveyor frame having first and second ends;

an upper drive mechanism which supports the upper frame, above an upper surface, at a support position between the first and second ends of the upper frame, the upper conveyor frame being positioned above the lower conveyor frame;

an intermediate frame having first and second ends;

a first hinge articulately connecting the first end of the intermediate frame to the lower frame, the first hinge having a horizontally oriented axis that is disposed transverse to the lower frame;

a second hinge articulately connecting the second end of the intermediate frame to the upper frame, the second hinge having a horizontally oriented axis that is disposed transverse to the upper frame;

an endless belt;

means for movably mounting the belt to the frames so that a portion of the belt is accommodated by the lower frame, a portion of the belt is accommodated by the intermediate frame, and a portion of the belt is accommodated by the upper frame, horizontally longitudinally displaceable means, between one of the upper and lower frames and the respective drive mechanism, for permitting the respective support position to move within predetermined limits between the first and second ends of the respective frame, the support position for the other of the upper and lower frames in the longitudinal direction being fixed;

a lower turntable;

a lower universal joint operatively connected to the lower turntable, the lower turntable and lower joint being disposed between the lower drive mechanism and the lower frame so that the lower frame is supported via the lower turntable and joint;

vertically disposed lower hydraulic cylinders operatively connected to the lower joint to control the orientation of the lower joint;

an upper turntable;

an upper universal joint operatively connected to the upper turntable, the upper turntable and upper joint being disposed between the upper drive mechanism and upper frame so that the upper frame is supported via the upper turntable and joint; and vertically disposed upper hydraulic cylinders operatively connected to the upper joint to control the orientation of the upper joint.

2. The conveyor of claim 1, wherein a feeding device deposits material on the portion of the belt that is accommodated by the lower frame, and a discharge device collects material from the portion of the belt that is accommodated by the upper frame.

3. The conveyor of claim 1, further comprising a hydraulic cylinder connecting the lower frame and the intermediate frame, and another hydraulic cylinder connecting the upper frame and the intermediate frame.

4. The conveyor of claim 1, wherein the lower frame comprises a lower beam; wherein the intermediate frame comprises a lower beam; wherein the upper frame comprises a lower beam; wherein the first hinge comprises a bolt joint connecting the lower beam of the lower frame to the lower beam of the intermediate frame; and wherein the second hinge comprises a bolt joint connecting the lower beam of the upper frame to the lower beam of the intermediate frame.

5. The conveyor of claim 1, wherein the belt has an upper run and a lower run; and further comprising first roller means for guiding the upper run of the belt in the region where the portion of the belt that is accommodated by the lower frame joins the portion of the belt that is accommodated by the intermediate frame; second roller means, separated from the first roller means, for guiding the lower run of the belt in the region where the portion of the belt that is accommodated by the lower frame joins the portion of the belt that is accommodated by the intermediate frame; third roller means for guiding the upper run of the belt in the region where the portion of the belt that is accommodated by the upper frame joins the portion of the belt that is accommodated by the intermediate frame; and fourth roller means, separated from the third roller means, for guiding the lower run of the belt in the region where the portion of the belt that is accommodated by the upper frame joins the portion of the belt that is accommodated by the intermediate frame.

6. The conveyor of claim 5, wherein the first hinge has an angular position, wherein the upper run of the belt has a top side and a bottom side, and wherein the first roller means comprises a plurality of rollers disposed at the top side and a plurality of rollers disposed at the bottom side, the rollers at the bottom side being arranged so that at least two rollers at the bottom side support the upper run of the belt regardless of the angular position of the first hinge.

7. A steep angle conveyor for transporting bulk material from a lower level to a higher level, comprising:

a lower conveyor frame;

a lower drive mechanism which supports the lower frame above a lower surface;

an upper conveyor frame;

an upper drive mechanism which supports the upper frame above an upper surface, the upper conveyor frame being positioned above the lower conveyor frame;

an intermediate frame having first and second ends;

a first hinge articulately connecting the first end of the intermediate frame to the lower frame, the first hinge having a horizontally oriented axis that is disposed transverse to the lower frame;

a second hinge articulately connecting the second end of the intermediate frame to the upper frame, the second hinge having a horizontally oriented axis that is disposed transverse to the upper frame;

an endless belt;

means for movably mounting the belt to the frames so that a portion of the belt is accommodated by the lower frame, a portion of the belt is accommodated by the intermediate frame, and a portion of the belt is accommodated by the upper frame;

a lower turntable;

a lower universal joint operatively connected to the lower turntable, the lower turntable and lower joint being disposed between the lower drive mechanism and the lower frame so that the lower frame is supported via the lower turntable and joint;

vertically disposed lower hydraulic cylinders operatively connected to the lower joint to control the orientation of the lower joint;

an upper turntable;

an upper universal joint operatively connected to the upper turntable, the upper turntable and upper joint being disposed between the upper drive mechanism and upper frame so that the upper frame is supported via the upper turntable and joint; and vertically disposed upper hydraulic cylinders operatively connected to the upper joint to control the orientation of the upper joint.

8. The conveyor of claim 7, wherein a feeding device deposits material on the portion of the belt that is accommodated by the lower frame, and a discharge device collects material from the portion of the belt that is accommodated by the upper frame.

9. The conveyor of claim 7, wherein the lower frame has first and second ends and the upper frame has first and second ends; wherein the lower drive mechanism supports the lower frame at a support position between the first and second ends thereof and the upper drive mechanism supports the upper frame at a support position between the first and second ends thereof; wherein the support position for one of the upper and lower frames in the longitudinal direction is fixed; and further comprising horizontally longitudinally displaceable means, between the other of the upper and lower frames and the respective drive mechanism, for permitting the other support position to move within predetermined limits between the first and second ends of the respective frame.

10. The conveyor of claim 7, further comprising a hydraulic cylinder connecting the lower frame and the intermediate frame, and another hydraulic cylinder connecting the upper frame and the intermediate frame.

11. The conveyor of claim 7, wherein the lower frame comprises a lower beam; wherein the intermediate frame comprises a lower beam; wherein the upper frame comprises a lower beam; wherein the first hinge comprises a bolt joint connecting the lower beam of the lower frame to the lower beam of the intermediate frame; and wherein the second hinge comprises a bolt joint connecting the lower beam of the upper frame to the lower beam of the intermediate frame.

12. The conveyor of claim 7, wherein the belt has an upper run and a lower run; and further comprising first roller means for guiding the upper run of the belt in the region where the portion of the belt that is accommodated by the lower frame joins the portion of the belt that is accommodated by the intermediate frame; second roller means, separated from the first roller means, for guiding the lower run of the belt in the region where the portion of the belt that is accommodated by the lower frame joins the portion of the belt that is accommodated by the intermediate frame; third roller means for guiding the upper run of the belt in the region where the portion of the belt that is accommodated by the upper frame joins the portion of the belt that is accommodated by the intermediate frame; and fourth roller means; separated from the third roller means, for guiding the lower run of the belt in the region where the portion of the belt that is accommodated by the upper frame joins the portion of the belt that is accommodated by the intermediate frame.

13. The conveyor of claim 12, wherein the first hinge has an angular position, wherein the upper run of the belt has a top side and a bottom side, and wherein the first roller means comprises a plurality of rollers disposed at the top side and a plurality of rollers disposed at the bottom side, the rollers at the bottom side being arranged so that at least two rollers at the bottom side support the upper run of the belt regardless of the angular position of the first hinge.

* * * * *